United States Patent
Kim et al.

(10) Patent No.: US 9,264,956 B2
(45) Date of Patent: Feb. 16, 2016

(54) METHOD AND DEVICE FOR HANDOVER IN MOBILE COMMUNICATION SYSTEM

(75) Inventors: Hakseong Kim, Gyeonggi-do (KR); Hanbyul Seo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 14/009,011

(22) PCT Filed: Mar. 28, 2012

(86) PCT No.: PCT/KR2012/002253
§ 371 (c)(1),
(2), (4) Date: Sep. 30, 2013

(87) PCT Pub. No.: WO2012/134156
PCT Pub. Date: Oct. 4, 2012

(65) Prior Publication Data
US 2014/0022981 A1    Jan. 23, 2014

Related U.S. Application Data

(60) Provisional application No. 61/468,067, filed on Mar. 28, 2011, provisional application No. 61/471,174, filed on Apr. 3, 2011, provisional application No. 61/473,169, filed on Apr. 8, 2011.

(51) Int. Cl.
*H04J 1/10* (2006.01)
*H04W 36/08* (2009.01)
(Continued)

(52) U.S. Cl.
CPC ............. *H04W 36/08* (2013.01); *H04L 5/0053* (2013.01); *H04L 5/0094* (2013.01); *H04W 36/0055* (2013.01); *H04W 56/0005* (2013.01)

(58) Field of Classification Search
CPC .............. H04W 36/08; H04W 36/055; H04W 56/0005; H04W 74/0833; H04W 74/006; H04L 5/0053; H04L 5/0094; H04L 5/0039; H04B 7/155
See application file for complete search history.

(56) References Cited

U.S. PATENT DOCUMENTS 8,483,107 B2 *   7/2013   Ahn et al. ...................... 370/280
8,548,514 B2 *  10/2013   Kim et al. ..................... 455/509
(Continued)

FOREIGN PATENT DOCUMENTS

| CN | 101932117 A | 12/2010 |
|---|---|---|
| EP | 2464190 A1 | 6/2012 |

(Continued)

OTHER PUBLICATIONS

Nokia Siemens Networks, Nokia Corporation: "New RRC Procedure Needed for RN", 3GPP TSG-RAN WG2 Meeting #71, R2-104397, Aug. 23-27, 2010.

(Continued)

*Primary Examiner* — Brian O'Connor
(74) *Attorney, Agent, or Firm* — Dentons US LLP

(57) ABSTRACT

An embodiment of the present invention relates to a method for a terminal to execute a handover in a mobile communication system, and comprises the steps of: receiving a handover command from a target base station; transmitting a random access preamble to the target base station; receiving a random access response from the target base station as a response to the random access preamble transmission, wherein information included in the random access response is obtained on a physical downlink shared channel (PDSCH) indicated by downlink allocation information included in a search space, and the information on the search space is included in information shared by a plurality of base stations including the target base station.

15 Claims, 10 Drawing Sheets

(51) Int. Cl.
*H04W 36/00* (2009.01)
*H04L 5/00* (2006.01)
*H04W 56/00* (2009.01)

(56) References Cited

U.S. PATENT DOCUMENTS

| | | | |
|---|---|---|---|
| 8,804,586 B2* | 8/2014 | Fong et al. | 370/311 |
| 8,861,452 B2* | 10/2014 | Barbieri et al. | 370/329 |
| 8,897,236 B2* | 11/2014 | Yoo et al. | 370/329 |
| 2011/0007673 A1* | 1/2011 | Ahn et al. | 370/280 |
| 2011/0069637 A1 | 3/2011 | Liu et al. | |
| 2012/0087299 A1* | 4/2012 | Bhattad et al. | 370/315 |
| 2012/0093064 A1* | 4/2012 | Horiuchi et al. | 370/315 |
| 2012/0099515 A1 | 4/2012 | Chen et al. | |
| 2014/0036740 A1* | 2/2014 | Lee et al. | 370/280 |

FOREIGN PATENT DOCUMENTS

| | | |
|---|---|---|
| JP | 2011-035861 A | 2/2011 |
| KR | 10-2009-0043434 A | 5/2009 |
| KR | 10-2010-0084675 A | 7/2010 |
| WO | 2004040933 A1 | 5/2004 |

OTHER PUBLICATIONS

Samsung: "Miscellaneous small clarifications and corrections", Change Request, 3GPP TSG-RAN2 Meeting #73, R2-111595, Feb. 21-25, 2011.

3GPP TSG RAN WG1 Meeting #62bis, R1-105498, R-PDCCH search space design, Oct. 15, 2010, pp. 1-5.

* cited by examiner

FIG. 10
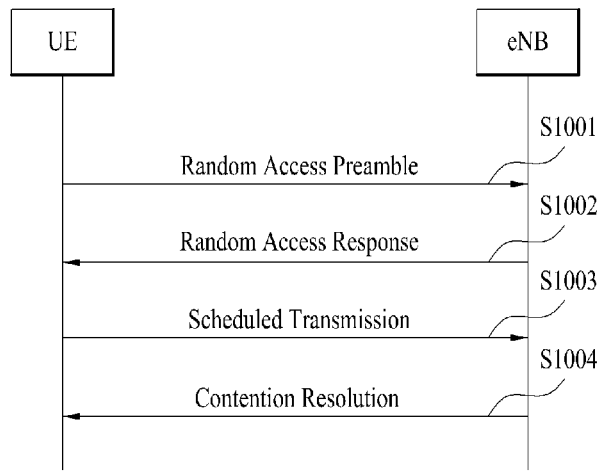
FIG. 11
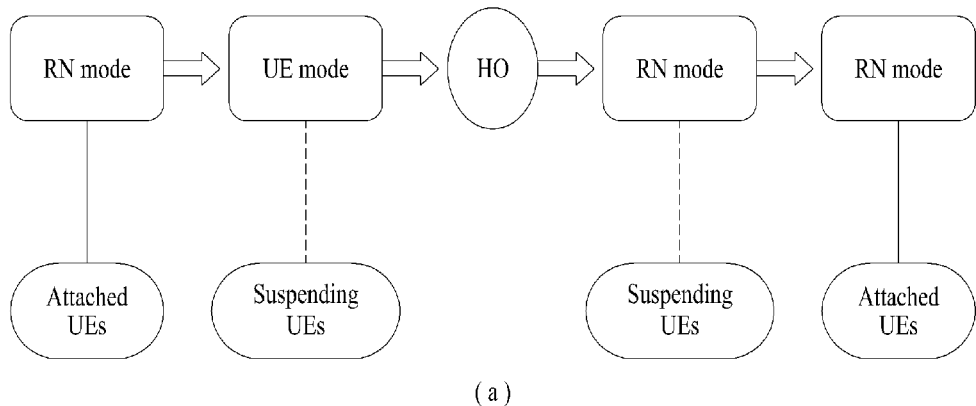
(a)
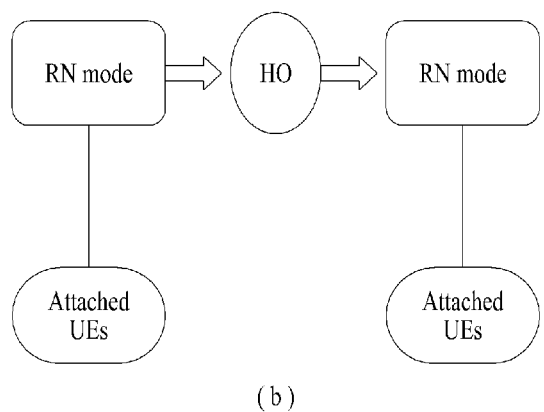
(b)

METHOD AND DEVICE FOR HANDOVER IN MOBILE COMMUNICATION SYSTEM

This Application is a 35 U.S.C. §371 National Stage Entry of International Application No. PCT/KR2012/002253, filed Mar. 28, 2012 and claims the benefit of U.S. Provisional Application No. 61/468,067, filed Mar. 28, 2011, U.S. Provisional Application 61/471,174, filed Apr. 3, 2011, and U.S. Provisional Application 61/473,169, filed Apr. 8, 2011, all of which are incorporated by reference in their entirety herein.

TECHNICAL FIELD

The present invention relates to a method and apparatus for handover in a mobile communication system.

BACKGROUND ART

Wireless communication systems have been widely deployed in order to provide various types of communication services including voice and data services. In general, a wireless communication system is a multiple access system that can support communication with multiple users by sharing available system resources (a bandwidth, transmission power, etc.). Examples of multiple access systems include code division multiple access (CDMA), frequency division multiple access (FDMA), time division multiple access (TDMA), orthogonal frequency division multiple access (OFDMA), single carrier frequency division multiple access (SC-FDMA), multi carrier frequency division multiple access (MC-FDMA), etc.

DISCLOSURE

Technical Problem

An object of the present invention devised to solve the problem lies in a method and apparatus for handover, in particular, in a method and apparatus for sharing information related to handover by a plurality of eNBs for a relay that moves at high speed.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first aspect of the present invention, provided herein is a handover method by user equipment (UE) in a mobile communication system, the handover method including receiving a handover command from a target base station (BS), transmitting a random access preamble to the target BS, and receiving a random access response from the target BS in response to transmission of the random access preamble, wherein information contained in the random access response is acquired on a physical downlink shared channel (PDSCH) indicated by downlink assignment information contained in information of a search space, and wherein the information of the search space is contained in information shared by a plurality of BSs including the target BS.

In a second aspect of the present invention, provided herein is a handover method by a base station (BS) in a mobile communication system, the handover method including transmitting a handover command, receiving a random access preamble from user equipment (UE) receiving the handover command, and transmitting a random access response in response to transmission of the random access preamble, wherein information contained in the random access response is transmitted on a physical downlink shared channel (PDSCH) indicated by downlink assignment information contained in information of a search space, and wherein the information of the search space is contained in information shared by a plurality of BSs including the BS.

In a third aspect of the present invention, provided herein is user equipment (UE) for handover in a mobile communication system, the UE including a transmit module, and a processor, wherein the processor receives a handover command from a target base station (BS), transmits a random access preamble to the target BS, and receives a random access response in response to transmission of the random access preamble, wherein information contained in the random access response is acquired on a physical downlink shared channel (PDSCH) indicated by downlink assignment information contained in information of a search space, and wherein the information of the search space is contained in information shared by a plurality of BSs including the target BS.

In a fourth aspect of the present invention, provided herein is a base station (BS) for handover in a mobile communication system, the BS including a transmit module and a processor, wherein the processor transmits a handover command, receives a random access preamble from a relay receiving the handover command, and transmits a random access response in response to transmission of the random access preamble, wherein information contained in the random access response is transmitted on a physical downlink shared channel (PDSCH) indicated by downlink assignment information contained in information of a search space, and wherein the information of the search space is contained in information shared by a plurality of BSs including the BS.

The first through fourth aspects of the present invention may entirely or partially include the following features.

The search space may be positioned in a resource region of any one of a relay-physical downlink control channel (R-PDCCH) and an enhanced-physical downlink control channel (e-PDCCH).

The plurality of BSs may be two or more contiguous BSs on a path of the UE when the path of the UE is predictable.

A resource region used to transmit the random access preamble may be the same in the plurality of BSs.

The random access response may include information of identifier (C-RNTI) in the target BS.

The random access response may include an error correction value required to adjust uplink synchronization by the UE, and the UE may determine the uplink synchronization using downlink transmission timing, an uplink timing correction value calculated by the UE, timing information based on movement of the UE, and the error correction value.

The handover method may further include transmitting a message including information of an identifier of the UE through resource indicated by uplink grant included in the random access response. Here, the message may be transmitted through a subframe subsequent to a predetermined value from a subframe receiving the random access response, and the message may be transmitted on a first appeared subframe for backhaul link after the subframe subsequent to the predetermined value when the subframe subsequent to the predetermined value is not the subframe for the backhaul link.

The subframe for backhaul link may be used in transmission of the random access and reception of the random access response.

Information shared by the plurality of BSs may include one or more of BS-relay subframe configuration information, resource allocation type information, resource block allocation information, demodulation reference signal information, start symbol information of physical downlink shared channel, and physical uplink control channel configuration information, when the UE is a relay.

The relay may be reconfigured using the information shared by the plurality of BSs during the handover.

The handover method may further include receiving information regarding a system frame number of the plurality of BSs.

Advantageous Effects

According to the present invention, although user equipment (UE) moves at high speed, rapid and smooth handover between plurality of base stations (BSs) may be supported. In addition, a relay may perform handover while maintaining service continuity of UEs attached to the relay.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 10 is a diagram for explanation of a contention-based random access procedure.

FIG. 11 is a diagram for explanation of handover of a relay according to an embodiment of the present invention.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon the case of a 3rd generation partnership project (3GPP) long term evolution (LTE) system or an LTE-advanced (LTE-A) system. However, the present technical features, aside from features unique to 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that user equipment (UE) refers to any mobile or fixed type device of a user side, such as user equipment, a mobile station (MS), etc., and that a base station (BS) refers to any node of a network side that communicates with the UE, such as a Node B, an eNode B, a base station, etc.

Figure 1:
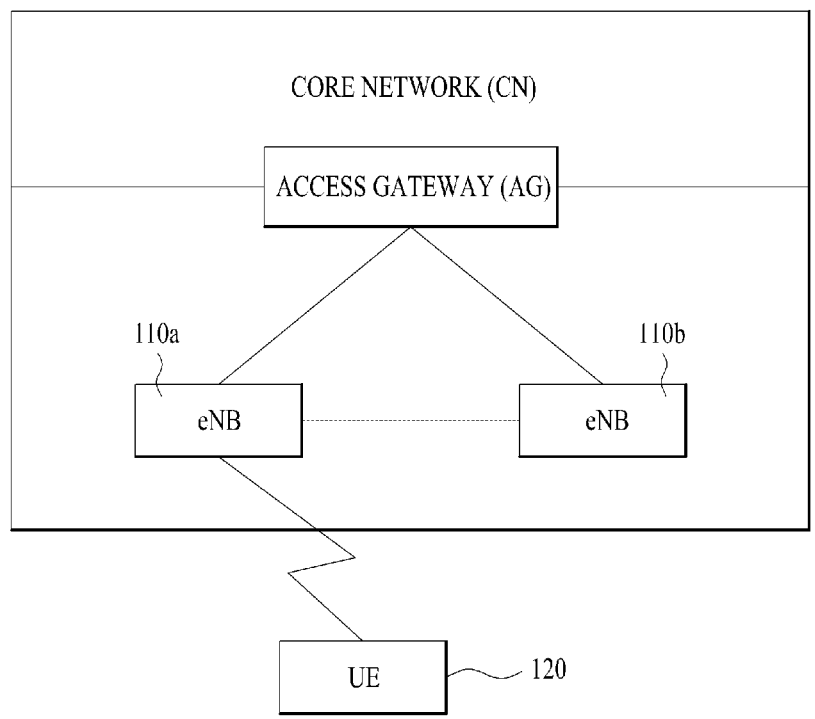
FIG. 1 is a diagram illustrating a structure of a long term evolution (LTE) system.

Referring to FIG. 1, an enhanced-universal mobile telecommunications system (E-UMTS) includes user equipment (UE) 120, eNodes B or eNBs 110a and 110b, and an access gateway (AG) positioned at the end of an evolved-universal terrestrial radio access network (E-UTRAN) and connected to an external network. An eNB may simultaneously transmit multiple data streams for a broadcast service, a multicast service, and/or a unicast service. One or more (e.g., three) cells are present in per eNB. A cell is configured to have any one bandwidth among 1.4, 3, 5, 10, 15, 20 MHz, etc. and provides a downlink or uplink transmission service to various UEs. Different cells may be configured to provide different bandwidths, respectively. The eNB controls data transmission and reception of a plurality of UEs. With regard to downlink (DL) data, an eNB transmits DL scheduling information to a corresponding UT to inform the corresponding UE of a time/frequency domain in which the data is to be transmitted, encoding, data size, hybrid automatic repeat and request (HARQ) related information, etc. In addition, with regard to uplink (UL) data, the eNB transmits UL scheduling information to a corresponding UE to inform the corresponding eNB of a time/frequency domain to be used by the corresponding eNB, encoding, a data size, HARQ related information, etc. An interface for transmission of user traffic or control traffic may be used between eNBs. A core network (CN) may include an AG, a network node for user registration of UE, etc. The AG manages mobility of UE in a unit of a tracking area (TA) including a plurality of cells.

Figure 2:
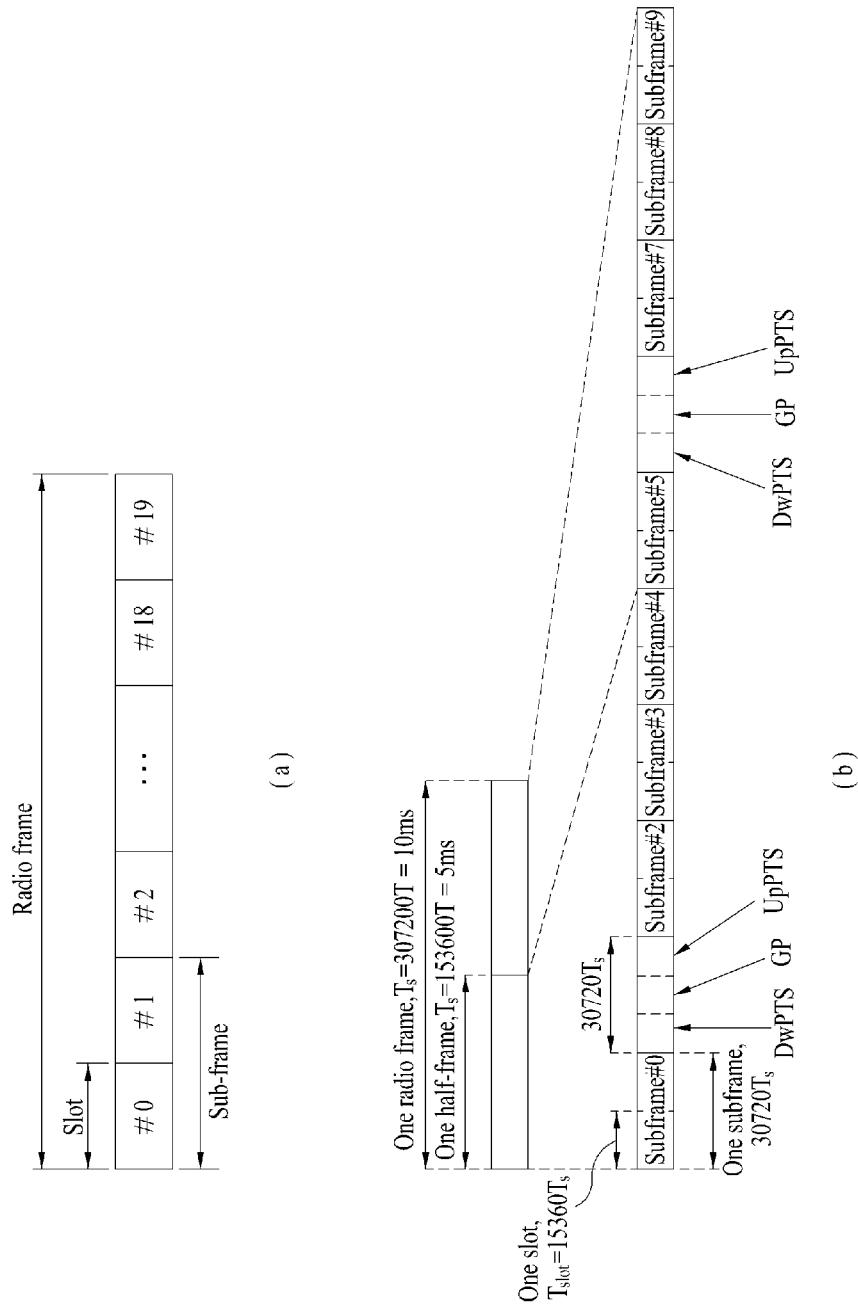
FIG. 2 is a diagram illustrating a structure of a radio frame used in a LTE system.

FIG. 2(A) illustrates a radio frame structure used in a 3rd generation partnership project (3GPP) long term evolution (LTE) system. One radio frame includes 10 subframes, and one subframe includes two slots. A time required to transmit one subframe is defined as a transmission time interval (TTI). For example, one subframe may have a length of 1 ms and one slot may have a length of 0.5 ms. One slot may include a plurality of OFDM symbols in a time domain. Since the 3GPP LTE system adopts OFDMA in DL, an OFDM symbol indicates one symbol period. The OFDM symbol may be referred to as an SC-FDMA symbol or a symbol period in UL. A resource block (RB) is a resource allocation unit including a plurality of contiguous subcarriers in a slot. The aforementioned structure of the radio frame is merely an example, and various modifications may be made in the number of subframes included in one radio frame, the number of slots included in one subframe, or the number of OFDM symbols included in one slot.

FIG. 2(B) illustrates a type 2 radio frame structure. The type 2 radio frame includes two half frames, each of which includes five subframes, a DL pilot time slot (DwPTS), a guard period (GP), and a UL pilot time slot (UpPTS). One subframe includes two slots. DwPTS is used for initial cell search, synchronization, or channel estimation by UE. UpPTS is used for channel estimation in an eNB and UL transmission synchronization of the UE. GP is located between UL and DL to remove interference generated in UL due to multi-path delay of a DL signal.

Here, the structure of the radio frame is merely an example, and various modifications may be made in the number of subframes included in the radio frame, the number of slots included in the subframe, or the number of symbols included in the slot.

Figure 3:
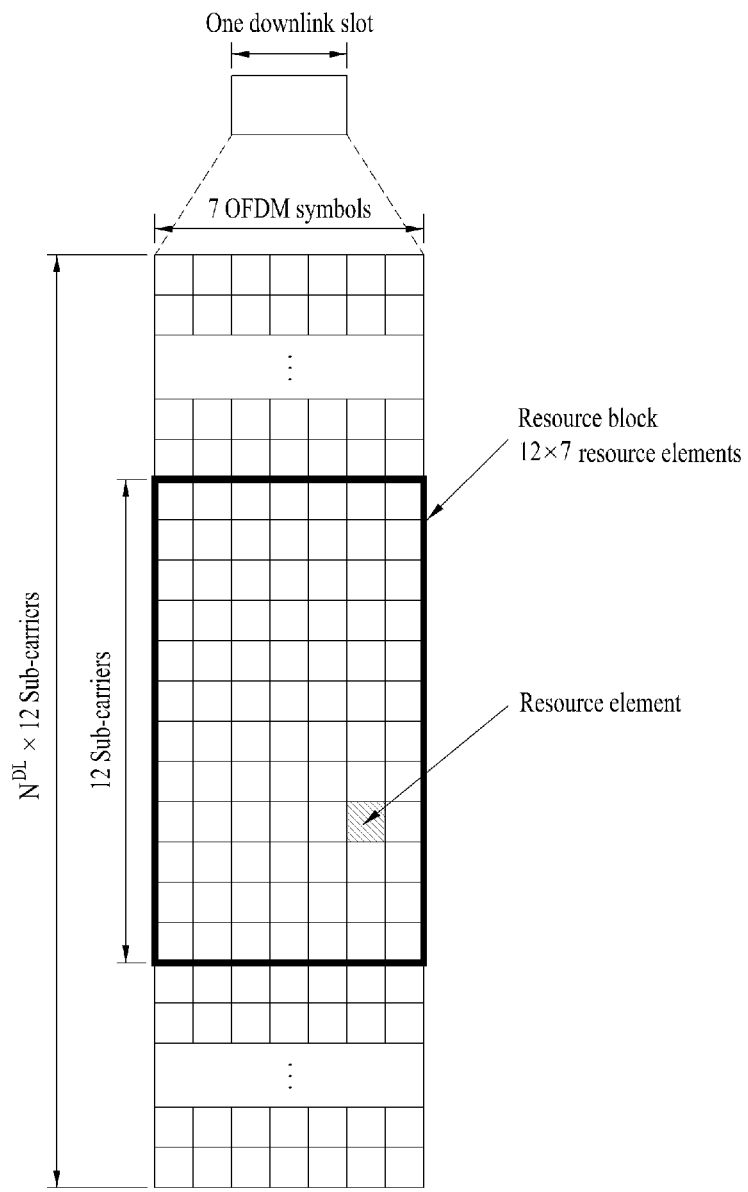
FIG. 3 is a diagram illustrating a resource grid for a downlink slot.

FIG. 3 is a diagram illustrating a resource grid for one DL slot. In FIG. 3, although one DL slot includes 7 OFDM symbols in a time domain and one RB includes 12 subcarriers in a frequency domain, embodiments of the present invention are not limited thereto. For example, in case of a normal cyclic prefix (CP), one slot includes 7 OFDM symbols. However, in case of extended-CP, one slot may include 6 OFDM symbols. Each element on the resource grid is referred to as a resource element (RE). One RB includes 12×7 REs. A value of $N^{DL}$ that is the number of RBs included in the DL slot may be determined based on a DL transmission bandwidth. A UL slot may have the same structure as the DL slot.

Figure 4:
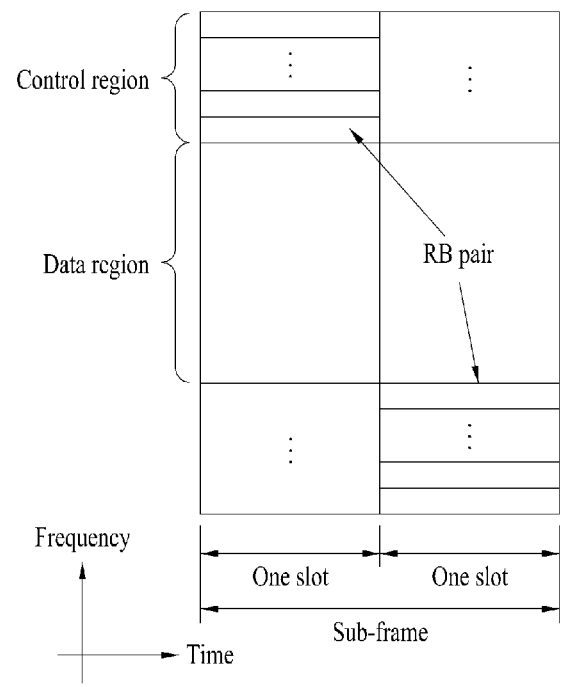
FIG. 4 is a diagram illustrating a structure of an uplink subframe.

FIG. 4 is a diagram illustrating a structure of a UL subframe. The UL subframe may be divided into a control region and a data region in a frequency domain. A physical UL control channel (PUCCH) including UL control information is allocated to the control region. A physical UL shared channel (PUSCH) including user data is allocated to the data region. To maintain single carrier properties, one UE does not simultaneously transmit the PUCCH and the PUSCH. The PUCCH for one UE is allocated to an RB pair in a subframe. RBs belonging to the RB pair occupy different subcarriers over two slots. That is, the RB pair allocated to the PUCCH is frequency-hopped at a slot boundary.

Figure 5:
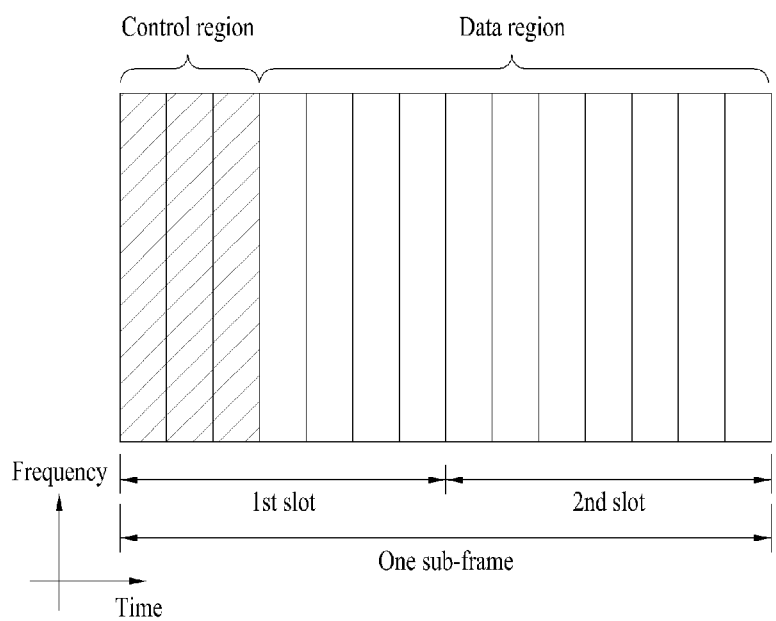
FIG. 5 is a diagram illustrating a structure of a downlink subframe.

FIG. 5 is a diagram illustrating a structure of a DL subframe. A maximum of four OFDM symbols of a front portion of a first slot within one subframe corresponds to a control region to which a control channel is allocated. The remaining OFDM symbols correspond to a data region to which a physical DL shared channel (PDSCH) is allocated. Examples of the DL control channels used in the 3GPP LTE system include a physical control format indicator channel (PCFICH), a physical DL control channel (PDCCH), a physical hybrid automatic repeat request indicator channel (PHICH), etc.

The PCFICH is transmitted on a first OFDM symbol of a subframe and includes information regarding the number of OFDM symbols used to transmit the control channel in the subframe. The PHICH includes a HARQ ACK/NACK signal as a response to UL transmission. The PDCCH includes UL or DL scheduling information and power control information.

Figure 6:
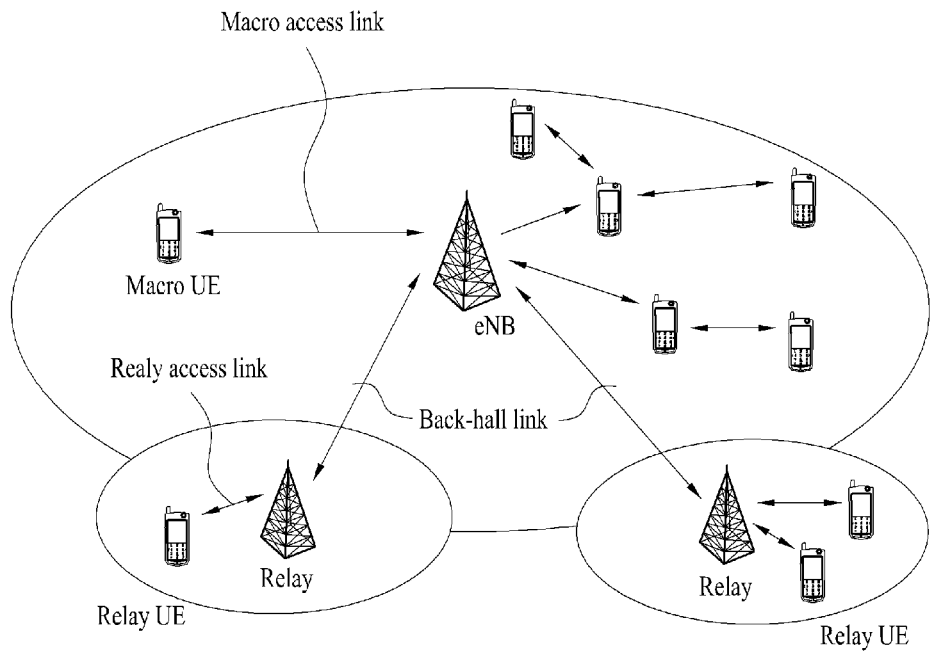
FIG. 6 is a diagram illustrating a wireless communication system including relays.

FIG. 6 is a diagram illustrating a wireless communication system including relays. A relay may extend a service region of an eNB or may be installed in a shadow region so as to facilitate a service.

Referring to FIG. 6, the wireless communication system includes an eNB, relays, and UEs. The UEs communicate with the eNB or the relays. UE that communicates with the eNB is referred to as a macro UE, and UE that communicates with the relay is referred to as a relay UE. A communication link between the eNB and the macro UE is referred to as a macro access link and a communication link between the relay and the relay UE is referred to as a relay access link. In addition, a communication link between the eNB and the relay is referred to as a backhaul link.

The relay may be classified as a layer 1 (L1) relay, a layer 2 (L2) relay, or a layer 3 (L3) relay according to a portion of a function performed by the relay during multi-hop transmission. In addition, the relay may be classified as an in-band connection in which network-relay link and a network-UE link share the same frequency band in a donor cell, and an out-band connection in which a network-relay link and a network-UE link use different frequency bands in a donor cell, according to network link. Furthermore, the relay may also be classified as a transparent relay, transmission through which a UE is unaware of, and a non-transparent relay, transmission through which a UE is aware of. In terms of mobility, the relay may be classified as a fixed relay that may be used in a shadow region or to increase cell coverage, a nomadic relay that may be temporally installed or randomly moved when the number of users suddenly increases, and a mobile relay that may be installed in public transportation such as a bus, a train, etc.

Figure 7:
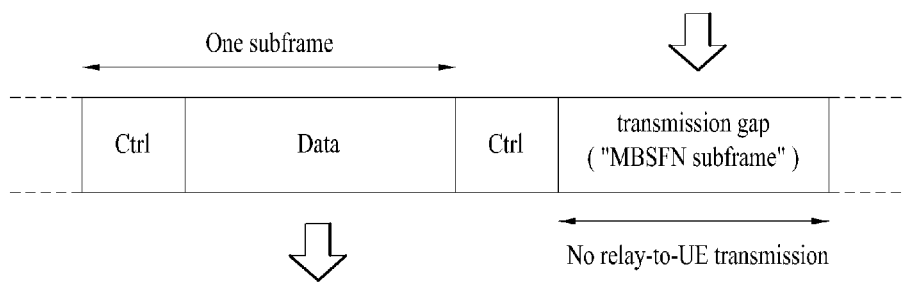
FIG. 7 is a diagram illustrating an example in which backhaul transmission is performed using a multicast broadcast single frequency network (MBSFN) subframe.

FIG. 7 is a diagram illustrating an example in which backhaul transmission is performed using a multicast broadcast single frequency network (MBSFN) subframe. In an in-band relay mode, an eNB-relay link (e.g., backhaul link) operates in the same frequency bandwidth as that of a relay-UE link (e.g., relay access link). When a relay transmits a signal to UE while receiving a signal from an eNB or receives a signal from the UE while transmitting a signal to the eNB, a transmitter and a receiver of the relay may interfere with each other, and thus, simultaneous transmission and reception of the relay may be limited. To this end, a backhaul link and relay access link may be partitioned in a TDM manner. An LTE-A system configures backhaul link in the MBSFN subframe in order to support a measurement operation of a legacy LTE UE present in a relay zone (a fake MBSFN method). When a certain subframe is signaled as an MBSFN subframe, UE may receive only a control region (Ctrl) of the corresponding subframe, and thus, a relay may configure backhaul link using the data region (Ctrl) of the corresponding subframe.

Figure 8:
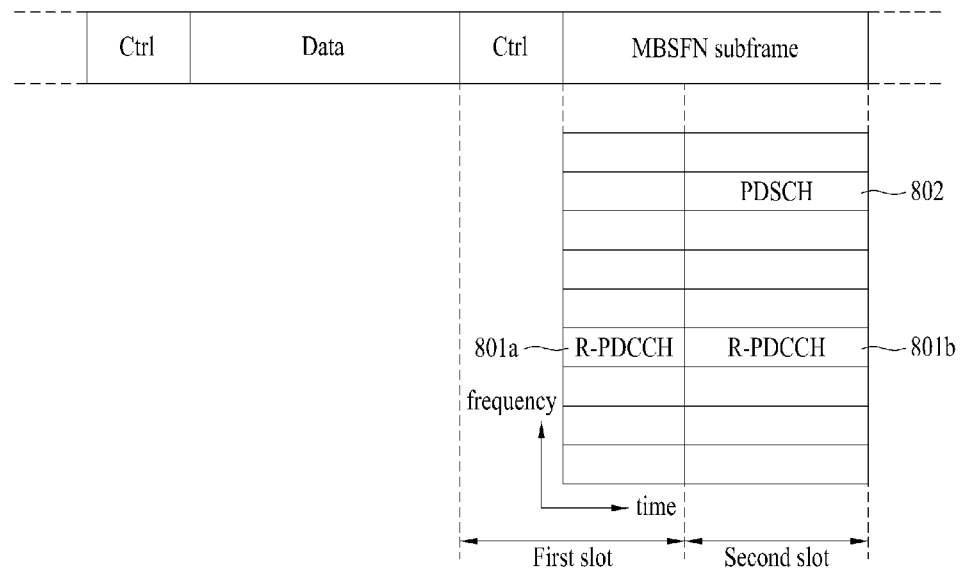
FIG. 8 is a diagram illustrating an example of a backhaul link subframe.

FIG. 8 is a diagram illustrating an example of a backhaul link subframe. The backhaul link subframe includes only a data region except for a control region of a subframe, as described with reference to FIG. 7, and thus, a separate control region needs to be allocated in order for an eNB to transmit control information. To this end, a relay-PDCCH (R-PDCCH) is introduced in LTE-A. R-PDCCH regions 801a and 801b may be determined using specific time frequency resources of an MBSFN subframe, as illustrated in FIG. 8. DL assignment information may be transmitted to a region 801a of the R-PDCCH regions 801a and 801b, corresponding to a first slot, and UL grant information may be transmitted to a region 801b corresponding to a second slot. Here, the DL assignment information may indicate a PDSCH 802. In this case, the relay may receive DL data through the PDSCH 802 after the R-PDCCH is decoded. When the UL grant information is not transmitted, the region 801b corresponding to the second slot may be used for PDSCH transmission.

Hereinafter, a handover procedure and a random access procedure that are performed by an LTE system will be described in detail.

Figure 9:
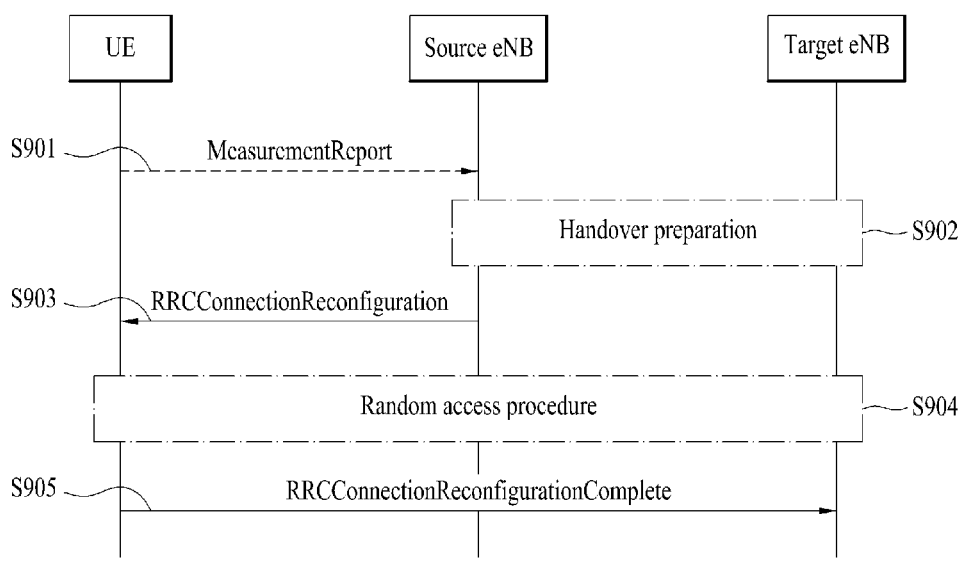
FIG. 9 is a diagram for explanation of a handover procedure.

FIG. 9 is a diagram for explanation of the handover procedure. Referring to FIG. 9, UE transmits a MeasurementReport message to a serving eNB that the UE currently accesses (S901). The serving eNB requests handover preparation to a target eNB before transmitting a handover command to the target eNB (S902). In this case, the serving eNB provides radio resource control (RRC) context information of the UE to the target eNB. The target eNB generates the handover command based on the RRC context command and transmits an RRCConnectionReconfiguration message including the handover command to the UE (S903). The RRCConnectionReconfiguration message is used to request handover to the UE and may include radio resource configuration information, security configuration, a cell identifier (C-RNTI), etc., which are commonly applied to UEs within a region of the target eNB. When the UE that has received the RRCConnectionReconfiguration message initiates the random access procedure to the target eNB (S904). When the random access procedure is successfully completed, the UE transmits an RRCConnectionReconfigurationComplete message to the target eNB to complete the handover procedure (S905).

The random access procedure of the handover procedure will now be described in detail. UE in an LTE system may perform the random access procedure in the following cases.

when the UE performs initial access without RRC connection with an eNB when the UE initially accesses a target cell during the handover procedure when the random access procedure is requested according to a command of an eNB when UL time synchronization is not proper or determined radio resources used to request radio resources are not allocated, if UL data is generated in case of a restoration procedure due to radio link failure or handover failure Based on the aforementioned description, a general contention-based random access procedure will be described below.

FIG. 10 is a diagram for explanation of processes of UE and an eNB in a contention-based random access procedure.

(1) Transmission of First Message

First, the UE may randomly select one random access preamble from a set of random access preambles indicated by system information or a handover command, and select and transmit physical RACH (PRACH) resources through which the random access preamble can be transmitted (S1001).

(2) Reception of Second Message

The UE transmits the random access preamble as in operation S1001 and then, attempts to receive a random access response of the UE within a random access response reception window indicated by the system information or the handover command from the eNB (S1002). In detail, the random access response information may be transmitted in the form of a MAC PDU. The MAC PDU may be transmitted through a physical DL shared channel (PDSCH). In addition, in order for the UE to appropriately receive information transmitted through the PDSCH, the UE may monitor a physical DL control channel (PDCCH). That is, the PDCCH may contain information of UE that needs to receive the PDSCH, frequency and time information of radio resources of the PDSCH, a transmission format of the PDSCH, etc. Once the UE successfully receives the PDCCH transmitted to the UE, the UE may appropriately receive the random access response transmitted through PDSCH according to the information of the PDCCH. In addition, the random access response may include a random access preamble identifier (ID), for example, a random access preamble identifier (RAPID), UL grant indicating UL radio resource, a temporary C-RNTI, and a timing advance command (TAC).

As described above, the random access response requires the random access preamble ID. This is because, since a random access response may include random access response information for one or more UEs, UE for which the UL grant, the temporary C-RNTI, and the TAC are valid needs to be indicated. In the present operation, it is assumed that the UE selects a random access preamble ID corresponding to the random access preamble selected by the UE in operation S1002. Thus, the UE may receive the UL grant, the temporary C-RNTI, the TAC, etc.

(3) Transmission of Third Message

When the UE receives the random access response valid to the UE, the UE processes information contained in the random access response. That is, the UE applies the TAC and stores the temporary C-RNTI. In addition, the UE may store data to be transmitted in response to reception of the valid random access response, in a message 3 buffer.

The UE transmits the data (i.e., the third message) to the eNB using the received UL grant (S1003). The third message needs to contain an ID of the UE. This is because, although, in the contention-based random access procedure, the eNB cannot determine UEs that perform the random access procedure, the UEs need to be identified for contention resolution afterwards.

As a method of containing an ID of UE, two methods are being studied. In a first method, when the UE already has a valid ID allocated from a corresponding cell prior to the random access procedure, the UE transmits the C-RNTI of the UE through a UL transmission signal corresponding to the UL grant. On the other hand, when the UE is not allocated a valid ID prior to the random access procedure, the UE contains a unique ID (e.g., S-TMSI or random ID) of the UE in data and transmits the data. In general, the unique ID is longer than the C-RNTI. When the UE transmits data corresponding to the UL grant, the UE initiates a contention resolution timer (referred to as a "CR timer").

(4) Reception of Fourth Message

The UE transmits data containing the ID thereof through the UL grant contained in the random access response, and then, waits for an instruction of the eNB for contention resolution. That is, in order to receive a specific message, the UE attempts to receive the PDCCH (S1004). As a method of receiving the PDCCH, two methods are being studied. As described above, when the third message transmitted in response to the UL grant is transmitted using the C-RNTI of the UE, the UE attempts to receive the PDCCH using the C-RNTI of the UE. In this case, when the C-RNTI is the unique ID, the UE may attempt to receive the PDCCH using the temporary C-RNTI contained in the random access response. Then, in the former case, when the UE receives the PDCCH through the C-RNTI of the UE before the CR timer expires, the UE determines that the random access procedure is normally performed to complete the random access procedure. In the latter case, when the UE receives the PDCCH through the temporary C-RNTI before the CR timer expires, the UE checks data transmitted by the PDSCH indicated by the PDCCH. When the unique ID of the UE is contained in the data, the UE determines that the random access procedure has been normally performed to complete the random access procedure.

Unlike the contention-based random access procedure illustrated in FIG. 10, a non-contention-based random access procedure is completed by transmitting the first message and the second message only. However, before the UE transmits the random access preamble as the first message to the eNB, the UE is allocated the random access preamble from the eNB, transmits the allocated random access preamble as the first message to the eNB, and receives the random access response from the eNB to complete the random access procedure.

A conventional LTE/LTE-A system defines only a fixed relay among the aforementioned relays and does not support a mobile relay. This means that the system does not define a handover procedure of a relay. Hereinafter, a handover procedure of the relay will be proposed.

FIG. 11 is a diagram for explanation of handover of a relay according to an embodiment of the present invention. FIG. 11(A) illustrates handover in which a current mode is switched to a UE mode only when the relay performs handover. FIG. 11(B) illustrates a method in which the relay performs handover via backhaul link.

Referring to FIG. 11(A), when a serving eNB requests handover to a target eNB to initiate a handover procedure, the relay converts a relay mode (RN mode) into UE mode to perform handover. Since the relay converts the current mode into the UE mode, services for UEs attached to the relay are inevitably stopped. Thus, although the handover proposed in FIG. 11(A) can be performed via the handover procedure defined in the conventional LTE/LTE-A system, service continuity of UEs attached to the relay is not ensured. Accordingly, in terms of service continuity, the handover of FIG. 11(A) may be used.

FIG. 11(B) proposes a method in which a current mode is not switched to UE mode when the relay performs handover, and the relay performs handover in an RN mode, unlike in FIG. 11(A). In this case, the relay may provide service continuity to UEs attached to the relay.

However, in order for the relay to perform handover in the RN mode, the random access procedure needs to be performed via the aforementioned backhaul link subframe, and thus, the relay needs to be configured and the conventional handover procedure and random access procedure need to be corrected. For example, in order for the relay to transmit the random access preamble to the target eNB via the backhaul link subframe, information regarding the backhaul link subframe of the target eNB is required. In addition, when the random access response is transmitted on PDSCH of the backhaul link subframe, information regarding a search space of R-PDCCH is required to determine a PDSCH resource region. Thus, the relay needs to be reconfigured using the aforementioned information and information to be described below. In addition, when a mobile relay moves at high speed, relay reconfiguration frequently occurs. Thus, in order to overcome this problem, the present invention proposes a method of sharing information regarding handover for relay reconfiguration, etc. by a plurality of eNBs including the target eNB.

Figure 12:
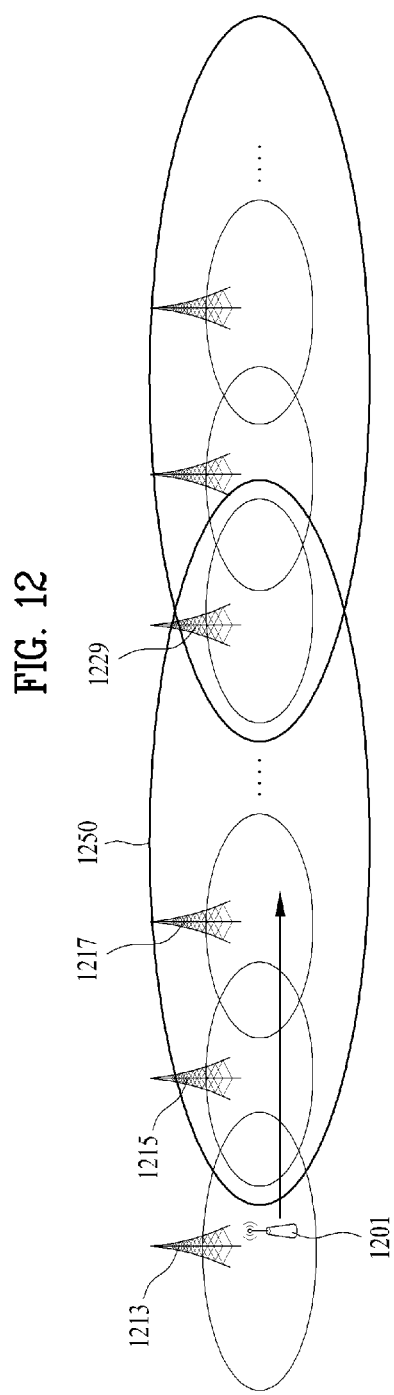
FIG. 12 is a diagram for explanation of handover between plurality of eNBs according to an embodiment of the present invention.

FIG. 12 is a diagram for explanation of handover between plural eNBs according to an embodiment of the present invention. Referring to FIG. 12, a mobile relay 1201 may perform handover to the target eNB 1215 from a serving eNB 1213 according to a handover command of a target eNB 1215. In this case, information regarding handover for relay reconfiguration, etc. may be set to be shared by the target eNB 1215 and eNBs 1217 to 1229 on a path of the mobile relay 1201, that is, an eNB set 1250.

Here, the information shared by the eNB set 1250 may include the following information. The following information may be changed during the relay reconfiguration and reconfigured during the handover procedure.

Search Space
Backhaul DL subframe configuration information-starting symbol and ending symbol
Serving C-RNTI (old C-RNTI) and target C-RNTI (new C-RNTI)
Scrambling information of target cell
Preamble information contained in HO command (dedicated RACH preamble information)
Backhaul link subframe pattern information in FDD (subframeConfigurationPatternFDD)
Backhaul link subframe pattern information in TDD (subframeConfigurationPatternTDD)
Random access resource allocation type for signaling and mapping of R-PDCCH search space (resourceAllocationType)
Length information of bitmap format for signaling R-PDCCH search space (resourceBlockAssignment)
R-PDCCH demodulation reference signal information (demodulationRS)
Information indicating start symbol of PDSCH of backhaul link (PDSCH-Start)
PUCCH ACK/NACK resource reservation information of upper layer (PUCCH-Config)

Among the aforementioned information, information of a search space may be used in the eNB set 1250 in the same manner. When the information of the search space is used in the eNBs 1215 to 1229 in the eNB set 1250 in different ways, the information may indicate how the information of the search space is changed. In addition, a specific resource region may be fixed as a search space and the search space may be applied to the eNB set 1250 in the same way.

As a method of sharing the aforementioned information by the eNB set 1250, the eNB set 1250 may share the information as the same value or a predetermined specific value. As the information, different values may be set based on an arrangement order of eNBs according to a predetermined rule. For example, as the information, a value may be increased or decreased according to a cell index or an arrangement order or may be determined using a predetermined pattern. When a mobile relay is installed in a high-speed train, or the like, a predetermined value may be used across an entire or partial section of a train line. In this case, a position of a section may be checked using a cell index, an eNB set index, a global positioning system (GPS), etc.

In addition, a time-frequency resource (RACH resource) used to transmit the random access preamble by the relay may also use the same configuration and provide the same ID in the eNB set 1250, thereby preventing collision and facilitating rapid access. When the same configuration is not used, an RACH accessible subframe in a cell in the eNB set 1250 needs to be predetermined resource. In addition, the RACH accessible subframe may be a predetermined specific resource pattern in a unit of the eNB set 1250 or a unit of an eNB. That is, resources may be reserved by changing various resource regions in specific hopping patterns instead of continuously using the same resource region (frequency and time).

In addition, the information shared by the eNB set 1250 may include a main information block (MIB) and/or system information blocks (SIBs). In the conventional LTE/LTE-A system, the MIB is transmitted on a broadcast channel (BCH) using the first four OFDM symbols in a second slot of a #0 subframe. A relay using a backhaul link subframe cannot receive the #0 subframe in TDD mode and, thus the relay cannot receive the MIB. Accordingly, the relay cannot receive a system frame number (SFN) included in the MIB. When an SFN of the target eNB cannot be known, the aforementioned subframe configuration information, etc. shared by the eNB set may not be applied, and a subframe corresponding to the backhaul link subframe cannot be known in terms of transmission of the random access preamble. Thus, problems may arise in terms of transmission and reception.

The problems may be overcome by including the MIB and/or SIBs in the aforementioned information shared by the eNB set. In addition, a difference between SFNs of eNBs performing handover may be signaled to the relay. In addition, the MIB and/or the SIBs may be configured to be transmitted on the PDSCH indicated by the R-PDCCH search space. In this case, the search space may be a relay specific search space or a common search space in which all relays can perform reception. In addition, the search space may be fixed to a specific subframe and a specific symbol position.

Unlike the aforementioned case, when the information regarding the SFN is not shared or signaled, only a cell specific reference signal (CRS) present in an MBSFN subframe may be configured for use in demodulation. In addition, the relay may be configured to attempt both conventional CRS-based demodulation and demodulation based only on a CRS present in the MBSFN subframe.

As describe above, the eNB set may share the aforementioned information such that the relay may perform handover using a backhaul link subframe, and the relay may be reconfigured using the aforementioned information and may perform handover.

A description of relay reconfiguration will be further given below. Details not described in detail below may be understood with reference to the 3GPP TS documentation.

1. General

Figure 13:
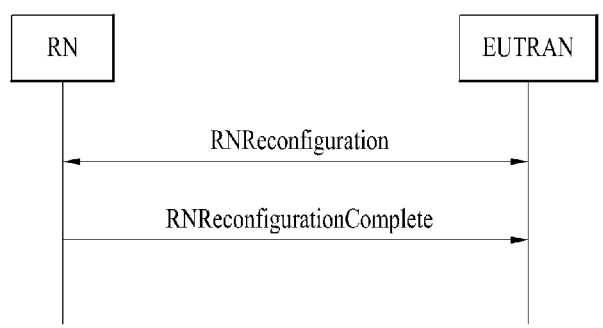
FIG. 13 is a schematic diagram illustrating a relay reconfiguration procedure according to an embodiment of the present invention.

The purpose of this procedure is to configure/reconfigure the relay subframe configuration and/or to update the system information relevant for the relay in RRC_CONNECTED. A schematic diagram of the procedure is illustrated in FIG. 13.

2. Initiation

An E-UTRAN may initiate the relay reconfiguration procedure to a relay in RRC_CONNECTED when access stratum (AS) security has been activated.

3. Reception of the RNReconfiguration by Relay

The relay may:
1> if the rn-SystemInfo is included:
2> if the systemInformationBlockType1 is included:
3> act upon the received SystemInformationBlockType1 as specified in 5.2.2.7 of 3GPP TS 36.331;
2> if the SystemInformationBlockType2 is included:
3> act upon the received SystemInformationBlockType2 as specified in 5.2.2.9 of 3GPP TS 36.331;
1> if the rn-SubframeConfig is included:
2> reconfigure lower layers in accordance with the received subframeConfigPatternFDD or subframeConfigPatternTDD;
2> if the rpdcch-Config is included:
3> reconfigure lower layers in accordance with the received rpdcch-Config;
1> submit the RNReconfigurationComplete message to lower layers for transmission, upon which the procedure ends;

4. Relay Reconfiguration

Tables 1 to 3 below show messages related to the aforementioned relay reconfiguration.

TABLE 1

The RNReconfiguration is a command to modify the RRC connection between the RN and the E-UTRAN. It may convey information for the RN subframe configuration and changed system information.
    Signalling radio bearer: SRB1
    RLC-SAP: AM
    Logical channel: DCCH
    Direction: E-UTRAN to RN

```
                                      RNReconfiguration message
-- ASN1START
RNReconfiguration-r10 ::=   SEQUENCE {
        rrc-TransactionIdentifier      RRC-TransactionIdentifier,
        criticalExtensions             CHOICE {
            c1                             CHOICE {
                rnReconfiguration-r10      RNReconfiguration-r10-IEs,
                spare3 NULL, spare2 NULL, spare1 NULL
            },
            criticalExtensionsFuture       SEQUENCE { }
        }
}
RNReconfiguration-r10-IEs ::=      SEQUENCE {
        rn-SystemInfo-r10              RN-SystemInfo-r10            OPTIONAL, -- Need ON
        rn-SubframeConfig-r10          RN-SubframeConfig-r10        OPTIONAL, -- Need ON
        lateNonCriticalExtension       OCTET STRING                 OPTIONAL, -- Need OP
        nonCriticalExtension           SEQUENCE { }                 OPTIONAL -- Need OP
}
RN-SystemInfo-r10 ::=              SEQUENCE {
        systemInformationBlockType1-r10   OCTET STRING (CONTAINING
                                          SystemInformationBlockType1)    OPTIONAL,
        -- Need ON
        systemInformationBlockType2-r10   SystemInformationBlockType2     OPTIONAL, -- Need ON
        ...
}
-- ASN1STOP
```

TABLE 2

- RNReconfigurationComplete
The RNReconfigurationComplete message is used to confirm the successful completion of an RN reconfiguration.
Signalling radio bearer: SRB1
RLC-SAP: AM TABLE 2-continued Logical channel: DCCH
Direction: RN to E-UTRAN
RNReconfigurationComplete message
-- ASN1START
```
RNReconfigurationComplete-r10 ::=      SEQUENCE {
    rrc-TransactionIdentifier           RRC-TransactionIdentifier,
    criticalExtensions                  CHOICE {
        c1                                  CHOICE {
            rnReconfigurationComplete-r10       RNReconfigurationComplete-r10-IEs,
            spare3 NULL, spare2 NULL, spare1 NULL
        },
        criticalExtensionsFuture            SEQUENCE { }
    }
}
RNReconfigurationComplete-r10-IEs ::=   SEQUENCE {
    lateNonCriticalExtension            OCTET STRING        OPTIONAL,
    nonCriticalExtension                SEQUENCE { }        OPTIONAL
}
```
-- ASN1STOP

TABLE 3

RN-SubframeConfig
The IE RN-SubframeConfig is used to specify the subframe configuration for an RN.
RN-SubframeConfig information element
-- ASN1START
```
RN-SubframeConfig-r10 ::=    SEQUENCE {
    subframeConfigPattern-r10           CHOICE {
        subframeConfigPatternFDD-r10        BIT STRING (SIZE(8)),
        subframeConfigPatternTDD-r10        INTEGER (0..31)
    },
    rpdcch-Config-r10                   SEQUENCE {
        resourceAllocationType-r10          ENUMERATED {type0, type1, type2Localized, type2Distributed},
        resourceBlockAssignment-r10             CHOICE {
            type01-r10                              CHOICE {
                nrb6-r10                                BIT STRING (SIZE(6)),
                nrb15-r10                               BIT STRING (SIZE(8)),
                nrb25-r10                               BIT STRING (SIZE(13)),
                nrb50-r10                               BIT STRING (SIZE(17)),
                nrb75-r10                               BIT STRING (SIZE(19)),
                nrb100-r10                              BIT STRING (SIZE(25))
            },
            type2-r10                               CHOICE {
                nrb6-r10                                BIT STRING (SIZE(5)),
                nrb15-r10                               BIT STRING (SIZE(7)),
                nrb25-r10                               BIT STRING (SIZE(9)),
                nrb50-r10                               BIT STRING (SIZE(11)),
                nrb75-r10                               BIT STRING (SIZE(12)),
                nrb100-r10                              BIT STRING (SIZE(13))
            }
        },
        demodulationRS-r10                  CHOICE {
            interleaving-r10                    ENUMERATED {crs},
            noInterleaving-r10                  ENUMERATED {crs, dmrs}
        },
        pdsch-Start-r10                     INTEGER (1..3),
        pucch-Config-r10                    SEQUENCE {
            n1-PUCCH-AN-port0-r10               INTEGER (0..2047),
            n1-PUCCH-AN-port1-r10               INTEGER (0..2047)
        },
        ...
    }
    OPTIONAL, -- Need ON
    ...
}
```
-- ASN1STOP

| RN-SubframeConfig field descriptions |
|---|
| demodulationRS |
| Indicates which reference signals are used for R-PDCCH demodulation according to TS 36.216 [55, 7.4.1]. Value interleaving corresponds to cross-interleaving and value noInterleaving corresponds to no cross-interleaving according to TS 36.216 [55, 7.4.2 and 7.4.3]. |
| n1-PUCCH-AN-port0 |

Parameter: $n_{PUCCH}^{(1,\,0)}$ see TS 36.216, [55, 7.5.1].

TABLE 3-continued n1-PUCCH-AN-port1

Parameter: $n_{PUCCH}^{(1,\,1)}$ see TS 36.216, [55, 7.5.1].
pdsch-Start

Parameter: DL-StartSymbol, see TS 36.216 [55, Table 5.4-1].
resourceAllocationType Represents the resource allocation used: type 0, type 1 or type 2 according to TS 36.213 [23, 7.1.6]. Value type0 corresponds to type 0, value type1 corresponds to type 1, value type2Localized corresponds to type 2 with localized virtual resource blocks and type2Distributed corresponds to type 2 with distributed virtual resource blocks.
resourceBlockAssignment Indicates the resource block assignment bits according to TS 36.213 [23, 7.1.6]. Value typed corresponds to type 0 and type 1, and the value type2 corresponds to type 2. Value nrb6 corresponds to a downlink system bandwidth of 6 resource blocks, value nrb15 corresponds to a downlink system bandwidth of 15 resource blocks, and so on.
subframeConfigurationPatternFDD Parameter: SubframeConfigurationFDD, see TS 36.216 [55, Table 5.2-1]. Defines the DL subframe configuration for eNB-to-RN transmission, i.e. those subframes in which the eNB may indicate downlink assignments for the RN. The radio frame in which the pattern starts (i.e. the radio frame in which the first bit of the subframeAllocationPatternFDD corresponds to subframe #0) occurs when SFN mod 4 = 0.
subframeConfigurationPatternTDD Parameter: SubframeConfigurationTDD, see TS 36.216 [55, Table 5.2-2]. Defines the DL and UL subframe configuration for eNB-RN transmission.

The aforementioned handover procedure of the relay will be described briefly.

When the relay receives the handover command from the target eNB, the relay transmits the random access preamble to a backhaul link subframe of a target eNB (message 1). The target eNB transmits a random access response using the backhaul subframe (message 2). In this case, the random access response is transmitted on PDSCH of the backhaul subframe, and DL assignment information indicating the PDSCH may be transmitted on R-PDCCH. The relay transmits a message 3 including a relay ID required for contention resolution through UL resources indicated by UL grant included in the random access response, on the PDSCH. Here, the message 3 needs to be transmitted through the backhaul subframe. Then, the relay receives a contention resolution message from an eNB to acquire the valid C-RNTI and transmits an RRCConnectionReconfigurationComplete message to the target eNB to complete the handover procedure. When a non-contention based random access procedure is used, the relay may receive the random access response to complete the random access procedure.

The random access preamble and the message 3 may be transmitted according to the following timing configuration.

If a PDCCH and/or R-PDCCH with associated RA-RNTI is detected in an $n_{th}$ subframe, and the corresponding DL-shared channel (DL-SCH) transport block contains a response to the transmitted preamble sequence, the relay may, according to the information in the response, transmit an UL-SCH transport block in the first subframe $n+k_1$, $k_1 \geq 6$, if the UL delay field is set to zero where $n+k_1$ is the first available UL subframe for PUSCH transmission. The relay may postpone the PUSCH transmission to the next available UL subframe after $n+k_1$ if the field is set to 1. However, if the available subframe is not the backhaul subframe, the relay may postpone the PUSCH transmission to the nearest available backhaul subframe after $n+k_1$ if the UL delay field is set to zero or to the nearest available UL backhaul subframe after $n+k_1$ if the UL delay field is set to 1. The $k_1$ can be a different value according to backhaul configuration, timing, an HARQ operation, FDD/TDD and so on. For simplicity, the transmission may be postponed to the nearest available backhaul subframe or to the next available RACH transmission opportunity.

If a random access response is received in an $n_{th}$ subframe, and the corresponding DL-SCH transport block does not contain a response to the transmitted preamble sequence, the relay may, if requested by higher layers, be ready to transmit a new preamble sequence no later than in subframe n+5 if it is available backhaul subframe. Otherwise, the transmission can be postponed to the nearest available backhaul subframe after n+5 or to the (nearest) available RACH transmission opportunity after n+5.

If no random access response is received in an $n_{th}$ subframe, where subframe n is the last subframe of the random access response window, the relay may, if requested by higher layers, be ready to transmit a new preamble sequence no later than in subframe n+4 if it is available backhaul subframe. Otherwise, the transmission can be postponed to the nearest available backhaul subframe after n+4 or to the nearest available RACH transmission opportunity after n+4.

In case a random access procedure is initiated by a PDCCH order in an $n_{th}$ subframe, the relay may, if requested by higher layers, transmit random access preamble in the first backhaul subframe $n+k_2$, $k_2 \geq 6$, where a PRACH resource is available.

The random access procedure of the aforementioned handover may be simplified via several methods that will be described below. The following methods may be applied together with the aforementioned methods when a mobile relay has accurate information regarding a route such as a high-speed train route and/or a mobile object.

First, the random access ID (RA-RNTI) and/or C-RNTI may be pre-set in a specific relay. Unique C-RNTIs may be allocated to specific relays, respectively. In addition, a mobile relay installed in a high-speed train, etc. may be allocated the C-RNTI for each respective section. In this case, a procedure of allocating the C-RNTI of the random access procedure may be simplified.

Second, in the random access response, the PDCCH masked with the C-RNTI instead of the random access ID (RA-RNTI) may be transmitted. In this case, a timing advance command included in the random access response may be set to transmit an absolute value in case of a mobile relay installed in a high-speed train, etc.

Third, during transmission of the random access response, the random access response may be set to contain both DL assignment information and UL grant information.

Fourth, the timing advance command included in the random access response may be replaced with an error correction value, unlike definition in the conventional LTE/LTE-A system. This corresponds to a case in which a mobile relay installed in a high-speed train, etc. recognizes a position thereof using a GPS, has information regarding a position of an eNB, a position of the train, a speed, a degree by which the train approaches the eNB, etc., and can calculate UL synchronization based on the information. However, error of reference time may occur between the eNB and the train. In addition, the eNB may transmit an error correction value to UL synchronization that is calculated by the mobile relay. In summary, when the mobile relay calculates a specific timing advance value $T_{Adjustment}$ at a specific position, performs UL transmission, and receives error correction information $T_{error}$ for the value from the eNB, the mobile relay may recognize that the train is closer to the eNB in next transmission ($T_{moving}$), set a value $T_{Adjustment}$ that is smaller than a value the value $T_{Adjustment}$ that has been calculated by the mobile relay, add error correction that has been transmitted from the eNB to determine a final value $T_{UL}$, and perform UL transmission, which may be represented by Equation 1 below.

$$T_{UL} = T_{DL} + T_{Adjustment} + T_{moving} + T_{error} \quad (1)$$

In Equation 1 above, $T_{UL}$ is UL synchronization, $T_{DL}$ is DL synchronization, $T_{Adjustment}$ is a timing advance value calculated by the mobile relay, and $T_{error}$ is an error correction value received from the eNB.

The description has been given in terms of a relay. The principle of the present invention may also be applied to UEs using e-PDCCH in the same way as long as the concept of the present invention does not have to be applied to only a relay, as relay reconfiguration. For example, it may be understood that the random access response may be transmitted on PDSCH indicated by DL assignment information included in information regarding a search space of the e-PDCCH, and that information of the random access response may be shared by the eNB set.

Figure 14:
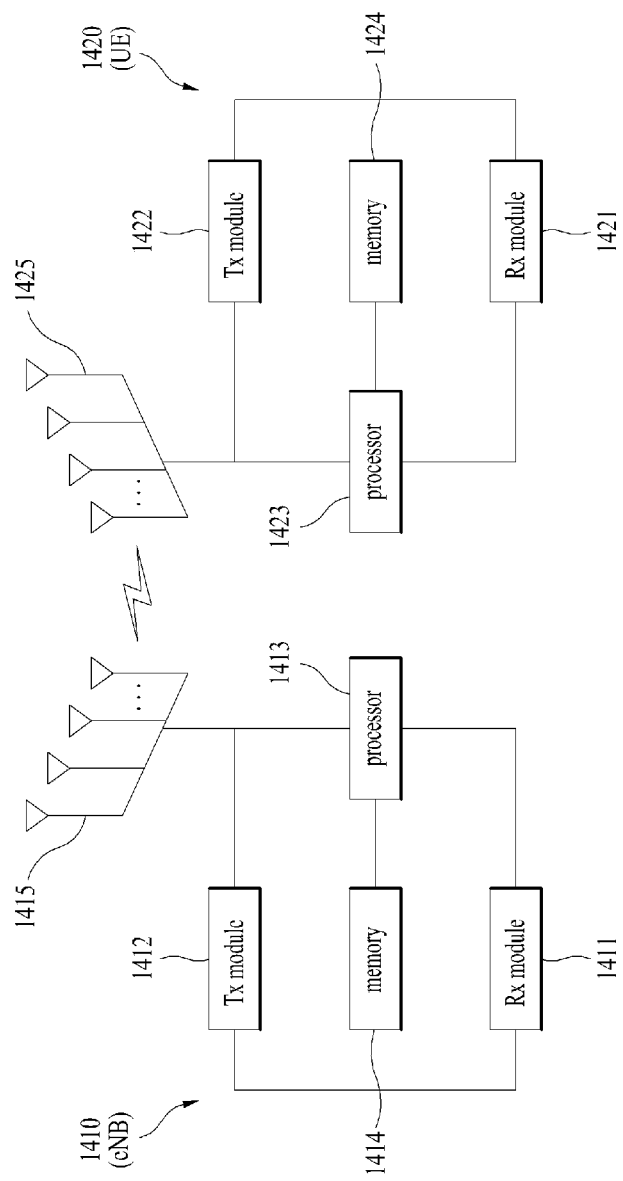
FIG. 14 is a diagram illustrating structures of an eNB and UE according to an exemplary embodiment of the present invention.

FIG. 14 is a diagram illustrating structures of an eNB 1410 and UE 1420 according to an exemplary embodiment of the present invention.

Referring to FIG. 14, the eNB 1410 according to the present invention may include a receive module 1411, a transmit module 1412, a processor 1413, a memory 1414, and a plurality of antennas 1415. The plural antennas 1415 refer to an apparatus of the eNB 1410 for supporting MIMO transmission and reception. The receive module 1411 may receive various signals, data, and information from the UE 1420 in UL. The transmit module 1412 may transmit various signals, data, and information to the UE 1420 in DL. The processor 1413 may control an overall operation of the eNB 1410.

The eNB 1410 according to an embodiment of the present invention may be configured to transmit control information regarding UL multi-antenna transmission. The processor 1413 of the eNB 1410 transmits a handover command, receives a random access preamble from the relay that has received the handover command and then transmits a random access response in response to transmission of the random access preamble. In this case, information included in the random access response may be transmitted on a physical shared channel (PDSCH) indicated by DL assignment information contained in information of the search space, and the search space may be included in information shared by a plurality of eNBs including the eNBs 1410.

In addition, the processor 1413 of the eNB 1410 calculates and processes information received by the eNB 1410, information to be transmitted outwards, etc. The memory 1414 may store the calculated and processed information for a predetermined period of time and may be replaced with a component such as a buffer (not shown).

Referring to FIG. 14, the UE 1420 according to the present invention may include a receive module 1421, a transmit module 1422, a processor 1423, a memory 1424, and a plurality of antennas 1425. The plural antennas refer to apparatuses of the UE 1420 for supporting MIMO transmission and reception. The receive module 1421 may receive various signals, data, and information from the eNB 1410 in DL. The transmit module 1422 may transmit various signals, data, and information to the eNB 1410 in UL. The processor 1423 may control an overall operation of the UE 1420.

The UE 1420 according to an embodiment of the present invention may be configured to perform UL multi-antenna transmission. The processor 1423 of the UE 1420 receives a handover command from a target eNB, transmits a random access preamble to the target eNB, and then, receives a random access response from the target eNB in response to transmission of the random access preamble. Information included in the random access response may be obtained on a PDSCH indicated by DL assignment information contained in information of the search space, and the search space may be included in information shared by a plurality of eNBs including the target eNB.

In addition, the processor 1423 of the UE 1420 calculates and processes information received by the UE 1420, information to be transmitted outwards, etc. The memory 1424 may store the calculated and processed information for a predetermined period of time and may be replaced with a component such as a buffer (not shown).

In detail, the eNB and the UE are configured by independently applying the features according to the aforementioned embodiments of the present invention or simultaneously applying two or more embodiments of the present invention, and a repeated explanation thereof will not be given.

In addition, the description of the eNB 1410 with reference to FIG. 14 may be applied to a relay as a DL transmitter or a UL receiver in the same manner. The description of the UE 1420 may be applied to a relay as a DL receiver or a UL transmitter in the same manner.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention have been described in terms of a 3rd generation partnership project (3GPP) long term evolution (LTE)-based mobile communication system, but the present invention may be applied to various mobile communication systems using the same or equivalent principles.

The invention claimed is:

1. A handover method by mobile relay in a mobile communication system, the handover method comprising:
   receiving a handover command from a target base station (BS);
   transmitting a random access preamble to the target BS according to a backhaul link subframe pattern; and
   receiving a random access response from the target BS in response to transmission of the random access preamble according to the backhaul link subframe pattern,
   wherein information contained in the random access response is acquired on a physical downlink shared channel (PDSCH) indicated by downlink assignment information contained in information of a search space, and
   wherein information for mobile relay handover including the information of the search space for the mobile relay and the backhaul link subframe pattern for the mobile relay is shared by a plurality of BSs comprising the target BS, the plurality of BSs are located on a moving path of the mobile relay.

2. The handover method according to claim 1, wherein the search space is positioned in a resource region of any one of a relay-physical downlink control channel (R-PDCCH) and an enhanced-physical downlink control channel (e-PDCCH).

3. The handover method according to claim 1, wherein the plurality of BSs are two or more contiguous BSs when the moving path of the mobile relay is predictable.

4. The handover method according to claim 1, wherein a resource region used to transmit the random access preamble is the same in the plurality of BSs.

5. The handover method according to claim 1, wherein the random access response comprises information of identifier (C-RNTI) in the target BS.

6. The handover method according to claim 1, wherein the random access response comprises an error correction value required to adjust uplink synchronization by the mobile relay, and
   wherein the mobile relay determines the uplink synchronization using downlink transmission timing, an uplink timing correction value calculated by the mobile relay, timing information based on movement of the mobile relay, and the error correction value.

7. The handover method according to claim 1, further comprising transmitting a message comprising information of an identifier of the mobile relay through resource indicated by uplink grant included in the random access response.

8. The handover method according to claim 7, wherein the message is transmitted through a subframe subsequent to a predetermined value from a subframe receiving the random access response, and
   wherein the message is transmitted on a first appeared subframe for backhaul link after the subframe subsequent to the predetermined value when the subframe subsequent to the predetermined value is not the subframe for the backhaul link.

9. The handover method according to claim 1, wherein subframe for backhaul link is used in transmission of the random access and reception of the random access response.

10. The handover method according to claim 1, wherein the information for mobile relay handover including shared by the plurality of BSs further comprises resource allocation type information, resource block allocation information, demodulation reference signal information, start symbol information of physical downlink shared channel, and physical uplink control channel configuration information.

11. The handover method according to claim 10, wherein the mobile relay is reconfigured using the information for mobile relay handover shared by the plurality of BSs during the handover.

12. The handover method according to claim 1, further comprising receiving information regarding a system frame number of the plurality of BSs.

13. A handover method by a base station (BS) in a mobile communication system, the handover method comprising:
   transmitting a handover command;
   receiving a random access preamble from a mobile relay according to a backhaul link subframe pattern; and
   transmitting a random access response in response to the random access preamble according to the backhaul link subframe pattern,
   wherein information contained in the random access response is transmitted on a physical downlink shared channel (PDSCH) indicated by downlink assignment information contained in information of a search space, and
   wherein information for mobile relay handover including the information of the search space for the mobile relay and the backhaul link subframe pattern for the mobile relay is shared by a plurality of BSs comprising the BS, the plurality of BSs are located on a moving path of the mobile relay.

14. A mobile relay for handover in a mobile communication system, the UE comprising:
a transmit module; and
a processor,
wherein the processor receives a handover command from a target base station (BS), transmits a random access preamble to the target BS according to a backhaul link subframe pattern, and receives a random access response in response to transmission of the random access preamble according to the backhaul link subframe pattern,
wherein information contained in the random access response is acquired on a physical downlink shared channel (PDSCH) indicated by downlink assignment information contained in information of a search space, and
wherein information for mobile relay handover including the information of the search space for the mobile relay and the backhaul link subframe pattern for the mobile relay is shared by a plurality of BSs comprising the target BS, the plurality of BSs are located on a moving path of the mobile relay.

15. A base station (BS) for handover in a mobile communication system, the BS comprising:
a transmit module; and
a processor,
wherein the processor transmits a handover command, receives a random access preamble from a mobile relay according to a backhaul link subframe pattern, and transmits a random access response in response to the random access preamble according to the backhaul link subframe pattern,
wherein information contained in the random access response is transmitted on a physical downlink shared channel (PDSCH) indicated by downlink assignment information contained in information of a search space, and
wherein information for mobile relay handover including the information of the search space for the mobile relay and the backhaul link subframe pattern for the mobile relay is shared by a plurality of BSs comprising the BS, the plurality of BSs are located on a moving path of the mobile relay.

* * * * *